(12) United States Patent
Hsueh et al.

(10) Patent No.: US 7,480,104 B2
(45) Date of Patent: Jan. 20, 2009

(54) LENS DEVICE

(75) Inventors: Chun-Yu Hsueh, Taichung (TW);
Duen-Kwei Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 63 days.

(21) Appl. No.: 11/807,753

(22) Filed: May 30, 2007

(65) Prior Publication Data

US 2007/0279772 A1 Dec. 6, 2007

(30) Foreign Application Priority Data

Jun. 5, 2006 (TW) ................................ 95119869 A

(51) Int. Cl.
*G02B 15/14* (2006.01)
(52) U.S. Cl. ...................................... 359/704; 359/699
(58) Field of Classification Search ......... 359/699–704; 396/592; 353/100, 101
See application file for complete search history.

(56) References Cited

U.S. PATENT DOCUMENTS

2005/0265716 A1* 12/2005 Tsuji ........................ 396/542

* cited by examiner

*Primary Examiner*—Joseph Martinez
(74) *Attorney, Agent, or Firm*—Trop, Pruner & Hu, P.C.

(57) ABSTRACT

A lens device includes a base unit, a rotatable barrel component, a press plate, and a lens unit. The base unit includes a base plate, and a stationary barrel component connected to the base plate and extending there from a long an axis. The rotatable barrel component is sleeved rotatably on the stationary barrel component. The press plate has at least one fixing end portion secured to the base unit, and a press section connected to the fixing end portion. The press section is elastically deformable relative to the fixing end portion and is disposed to abut against an annular outer surface of the rotatable barrel component to resist axial movement of the rotatable barrel component. The lens unit is driven to move relative to the base unit along the axis upon rotation of the rotatable barrel component.

10 Claims, 8 Drawing Sheets

US 7,480,104 B2

LENS DEVICE

CROSS-REFERENCE TO RELATED APPLICATION

This application claims priority of Taiwanese Application No. 095119869, filed on Jun. 5, 2006.

BACKGROUND OF THE INVENTION

1. Field of the Invention

The invention relates to optical equipment, more particularly to a lens device that can operate precisely during zoom adjustment.

2. Description of the Related Art

As shown in FIG. 1, a conventional lens device includes a base 1, a stationary barrel component 2 mounted to the base 1, a rotatable barrel component 3 sleeved rotatably on the stationary barrel component 2, a first lens unit 4 extending into the stationary barrel component 2, a second lens unit 5, a third lens unit 6, and an anti-slip component 7 disposed between the stationary barrel component 2 and the rotatable barrel component 3.

The stationary barrel component 2 is mounted to the base 1 through a plurality of screws 201 (only one is shown), and has an inner barrel surface 203 that surrounds an axis (K) and that defines an inner space 202, an outer barrel surface 204 that is disposed opposite to the inner barrel surface 203 in radial directions relative to the axis (K), and a stop flange 206 that is disposed opposite to the base 1 along the axis (K) and that extends radially and outwardly from the outer barrel surface 204. The stationary barrel component 2 is formed with a plurality of elongated slots 205 that extend through the inner and outer barrel surfaces 203, 204, and that extend parallel to the axis (K). The rotatable barrel component 3 has an annular inner surface 301 that confronts the outer barrel surface 204 of the stationary barrel component 2. The rotatable barrel component 3 is formed with a plurality of first cam slots 302 that correspond respectively in position to the elongated slots 205 in the stationary barrel component 2 and that extend around the axis (K), and a plurality of second cam slots 303 that are staggered relative to the first cam slots 302 and that also correspond respectively in position to the elongated slots 205. The first lens unit 4 extends into the inner space 202 in the stationary barrel component 2, is movable relative to the third lens unit 6 along the axis (K), and includes a first lens barrel 401 and a first lens 402 that is disposed in the first lens barrel 401. The first lens barrel 401 has a plurality of first guide pins 403 that extend through the elongated slots 205 in the stationary barrel component 2, and that are guided by the first cam slots 302 in the rotatable barrel component 3. The second lens unit 5 is disposed in the inner space 202 in the stationary barrel component 2, is also movable relative to the third lens unit 6 along the axis (K), and includes a second lens barrel 501 and a second lens 502 that is disposed in the second lens barrel 501. The second lens barrel 501 has a plurality of second guide pins 503 that extend through the elongated slots 205 in the stationary barrel component 2, and that are guided by the second cam slots 303 in the rotatable barrel component 3. The anti-slip component 7, such as an annular piece of flock paper, can position the rotatable barrel component 3 relative to the stationary barrel component 2 through friction. When the rotatable barrel component 3 rotates, it will drive the first and second lens units 4, 5 to move relative to the third lens unit 6, thereby resulting in zoom adjustment for the conventional lens device.

The rotatable barrel component 3 is positioned relative to the stationary barrel component 2 along the axis (K) through the base 1 and the stop flange 206 of the stationary barrel component 2. In order for the rotatable barrel component 3 to rotate smoothly relative to the stationary barrel component 2, there is a gap 8 formed between the stop flange 206 and a radial end face of the rotatable barrel component 3 that confronts the stop flange 206. However, the gap 8 also provides room for the rotatable barrel component 3 to be movable along the axis (K) while rotating. Therefore, the first and second lens units 4, 5 driven by the rotatable barrel component 3 are not able to move precisely during zoom adjustment. Moreover, axial movement of the rotatable barrel component 3 while rotating will result in an image shaking effect.

In addition, the anti-slip component 7 is disposed in order to increase the friction between the stationary barrel component 2 and the rotatable barrel component 3, and to eliminate the image shaking effect. However, installation of the anti-slip component 7 results in a relatively long manufacturing time and a relatively high manufacturing cost. Moreover, since the anti-slip component 7 is made of flock paper, flocks thereof may fall off, thereby resulting in an unstable quality for the conventional lens device.

SUMMARY OF THE INVENTION

Therefore, the object of the present invention is to provide a lens device having rotatable components that can be positioned along an axis and that are able to rotate smoothly relative to stationary components during zoom adjustment.

Accordingly, a lens device of the present invention comprises a base unit, a rotatable barrel component, a press plate, and a lens unit. The base unit includes a base plate that has a positioning surface, and a stationary barrel component that is connected to the base plate, and that extends from the positioning surface of the base plate along an axis. The stationary barrel component has an inner barrel surface that surrounds the axis and that defines an inner space, and an outer barrel surface that is disposed opposite to the inner barrel surface in radial directions relative to the axis. The stationary barrel component is formed with a plurality of elongated slots that extend through the inner and outer barrel surfaces and that extend parallel to the axis. The rotatable barrel component is sleeved rotatably on the stationary barrel component, and has a first end face abutting against the positioning surface of the base plate, a second end face disposed opposite to the first end face along the axis, an annular inner surface interconnecting the first and second end faces and confronting the outer barrel surface of the stationary barrel component, and an annular outer surface disposed opposite to the annular inner surface in radial directions relative to the axis. The annular inner surface is formed with a plurality of cam slots that correspond respectively in position to the elongated slots in the stationary barrel component and that extend around the axis. The annular outer surface has a large diameter portion, a small diameter portion, and a shoulder portion interconnecting the large and small diameter portions. The press plate has at least one fixing end portion secured to the base unit, and a press section connected to the fixing end portion. The press section is elastically deformable relative to the fixing end portion and is disposed to abut against the shoulder portion of the annular outer surface of the rotatable barrel component. The lens unit extends into the inner space in the stationary barrel component of the base unit and is movable relative to the base unit along the axis. The lens unit includes a first lens barrel, and a first lens disposed in the first lens barrel. The first lens barrel has a plurality of guide pins that extend through the elongated slots in the stationary barrel component of the base unit, and that are guided by the cam slots in the rotatable barrel component.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
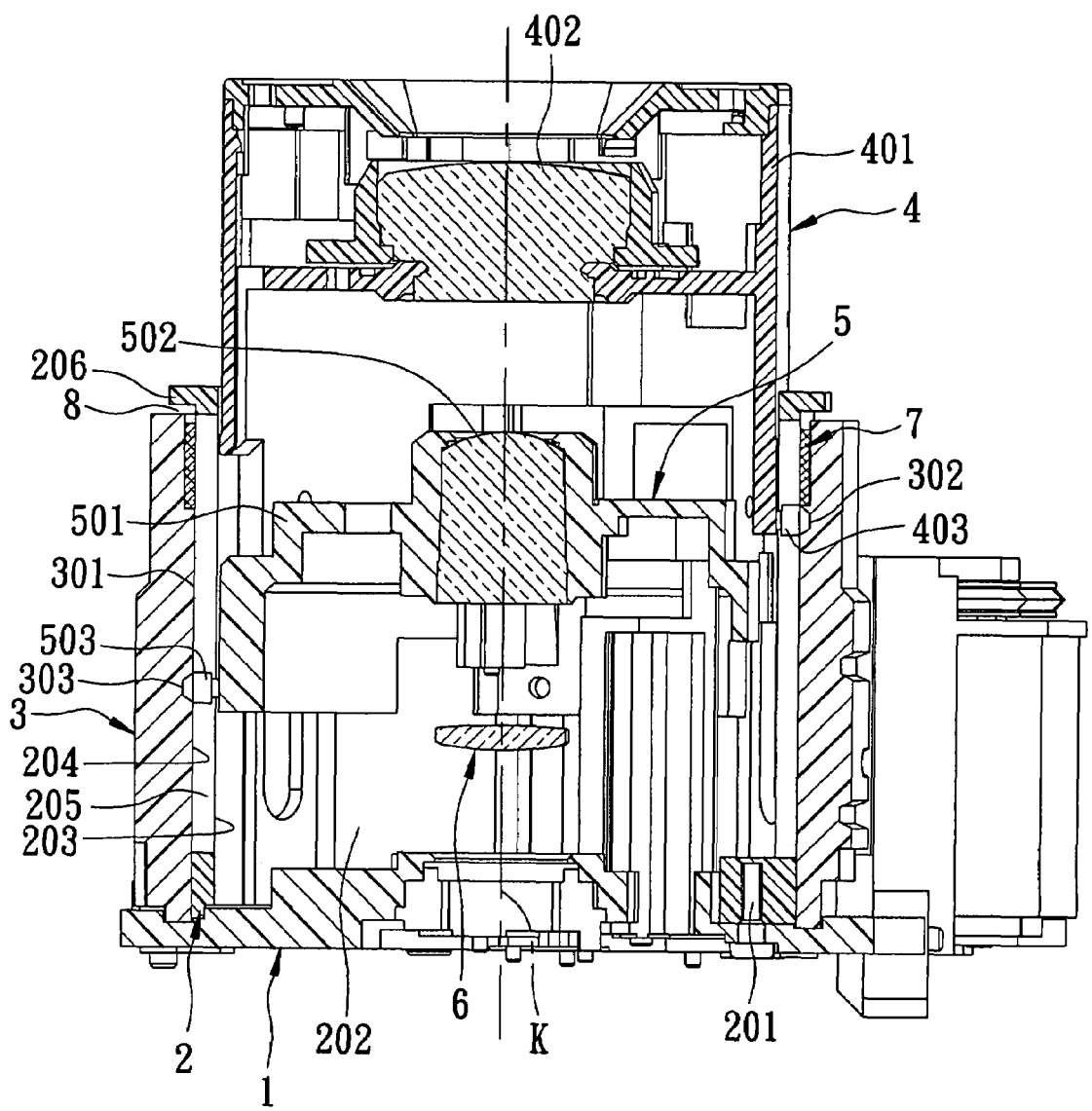
FIG. 1 is an assembled partly sectional view of a conventional lens device.

As shown in FIGS. 2 to 5, the preferred embodiment of a lens device according to the present invention comprises a base unit 10, a rotatable barrel component 20 sleeved rotatably on the base unit 10, a driving unit 30 for driving rotation of the rotatable barrel component 20, a press plate 40 for positioning the rotatable barrel component 20 relative to the base unit 10, a first lens unit 50, a second lens unit 60, a third lens unit 70, and a spring 80 disposed between first and second lens units 50, 60.

The base unit 10 includes a base plate 11 that has a positioning surface 111, and a stationary barrel component 12 that is connected integrally to the base plate 11, that extends from the positioning surface 111 of the base plate 11 along an axis (L), and that has an inner barrel surface 122 surrounding the axis (L) and defining an inner space 121, and an outer barrel surface 123 disposed opposite to the inner barrel surface 122 in radial directions relative to the axis (L). The stationary barrel component 12 is formed with a plurality of first elongated slots 124 (see FIG. 5) that extend through the inner and outer barrel surfaces 122, 123 and that extend parallel to the axis (L), and a plurality of second elongated slots 125 (see FIG. 4) that extend through the inner and outer barrel surfaces 122, 123 and that are staggered relative to the first elongated slots 124. The base unit 10 further includes an annular ornamental component 13 disposed opposite to the base plate 11 and engaging fittingly the stationary barrel component 12. The annular ornamental component 13 includes a stop portion 131, and a plurality of engaging portions 132 that extend from the stop portion 131 along the axis (L) to engage the stationary barrel component 12.

The rotatable barrel component 20 is sleeved rotatably on the stationary barrel component 12, and has a first end face 21 that abuts against the positioning surface 111 of the base plate 11, a second end face 22 that is disposed opposite to the first end face 21 along the axis (L), an annular inner surface 23 that interconnects the first and second end faces 21, 22 and that confronts the outer barrel surface 123 of the stationary barrel component 12, and an annular outer surface 24 that is disposed opposite to the annular inner surface 23 in radial directions relative to the axis (L). The annular inner surface 23 is formed with a plurality of first cam slots 231 (see FIG. 5) that correspond respectively in position to the first elongated slots 124 in the stationary barrel component 12 and that extend around the axis (L), and a plurality of second cam slots 232 (see FIG. 4) that correspond respectively in position to the second elongated slots 125 and that are staggered relative to the first cam slots 231. The annular outer surface 24 has a large diameter portion 241, a small diameter portion 242, and a shoulder portion 243 that interconnects the large and small diameter portions 241, 242. In this embodiment, the large diameter portion 241 is formed with gear teeth 244.

The base unit 10 further includes a pair of positioning blocks 112 that protrude from the positioning surface 111 of the base plate 11 and that are disposed at two sides of the shoulder portion 243 of the annular outer surface 24 of the rotatable barrel component 20, a pair of screws 113 that are fastened respectively to the positioning blocks 112, and a pair of positioning pins 114, each of which protrudes from a respective one of the positioning blocks 112 in a direction away from the positioning surface 111 of the base plate 11 and is disposed adjacent to a respective one of the screws 113.

Figure 3:
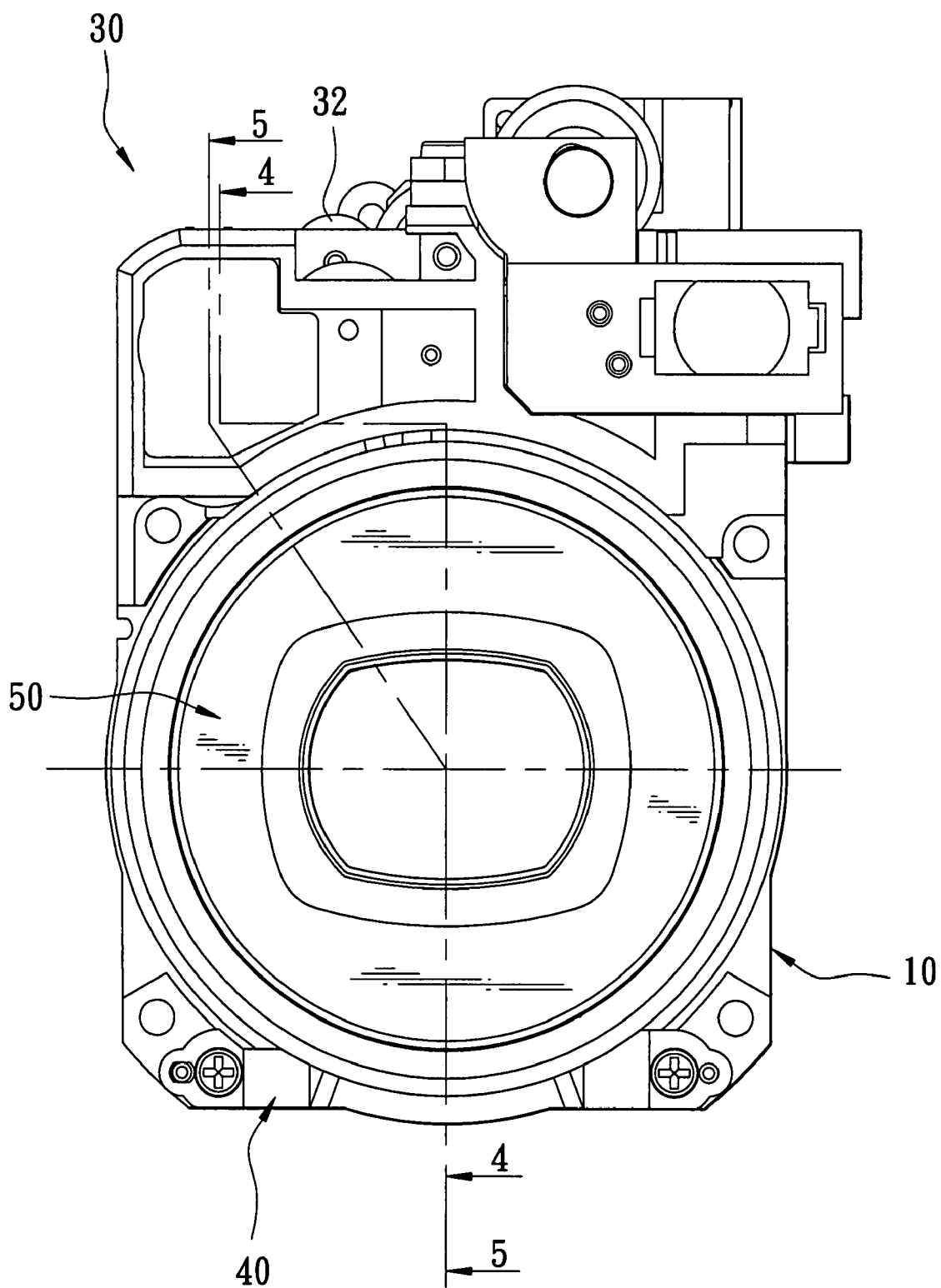
FIG. 3 is a top view of the preferred embodiment.
Figure 6:
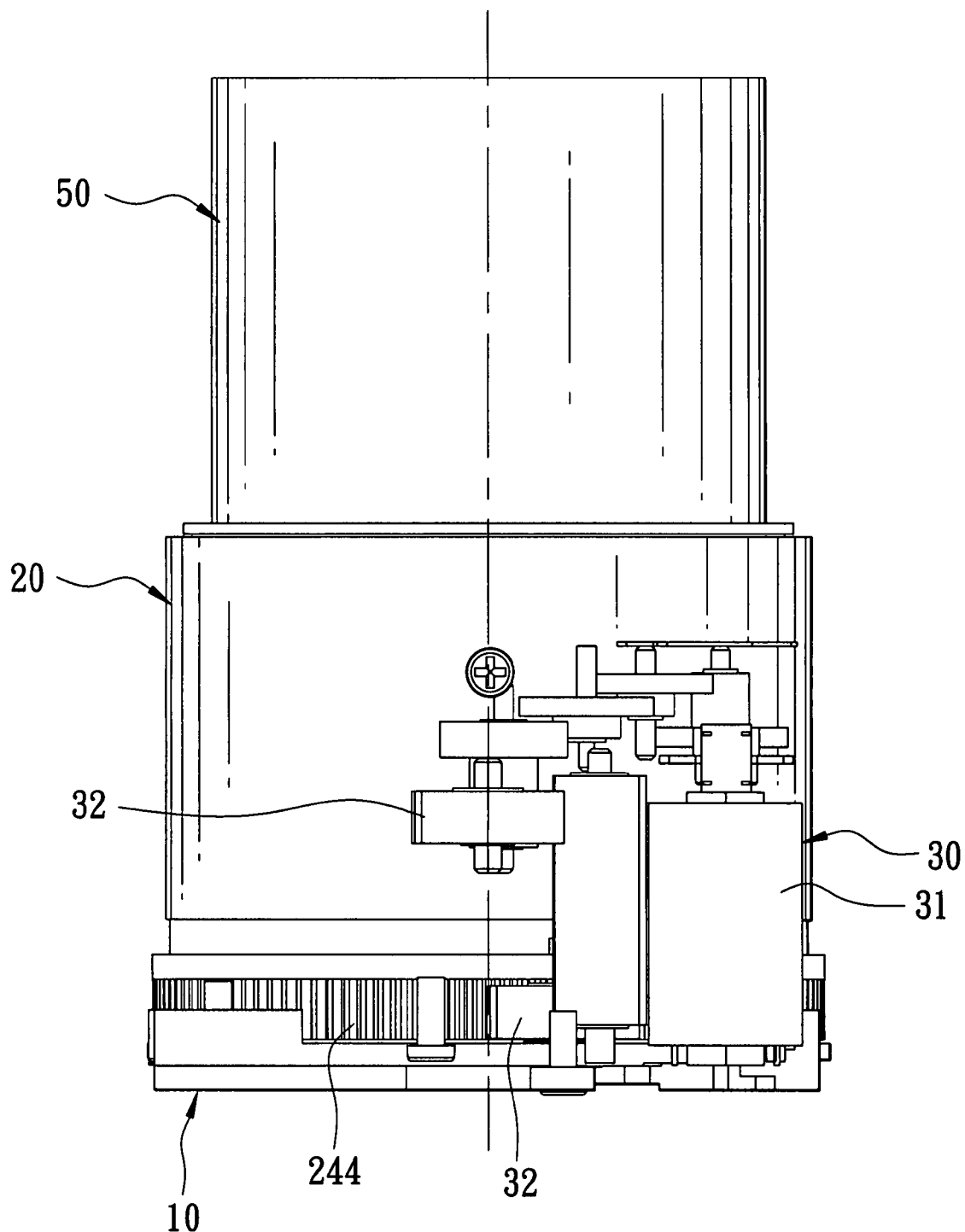
FIG. 6 is a side view of the preferred embodiment, illustrating a driving unit thereof.

The driving unit 30 is mounted to the base plate 11 of the base unit 10, and includes a motor 31 and a transmission gear unit 32 driven by the motor 31 and meshing with the gear teeth 244 on the large diameter portion 241 of the annular outer surface 24 of the rotatable barrel component 20 (see FIGS. 3 and 6).

Figure 7:
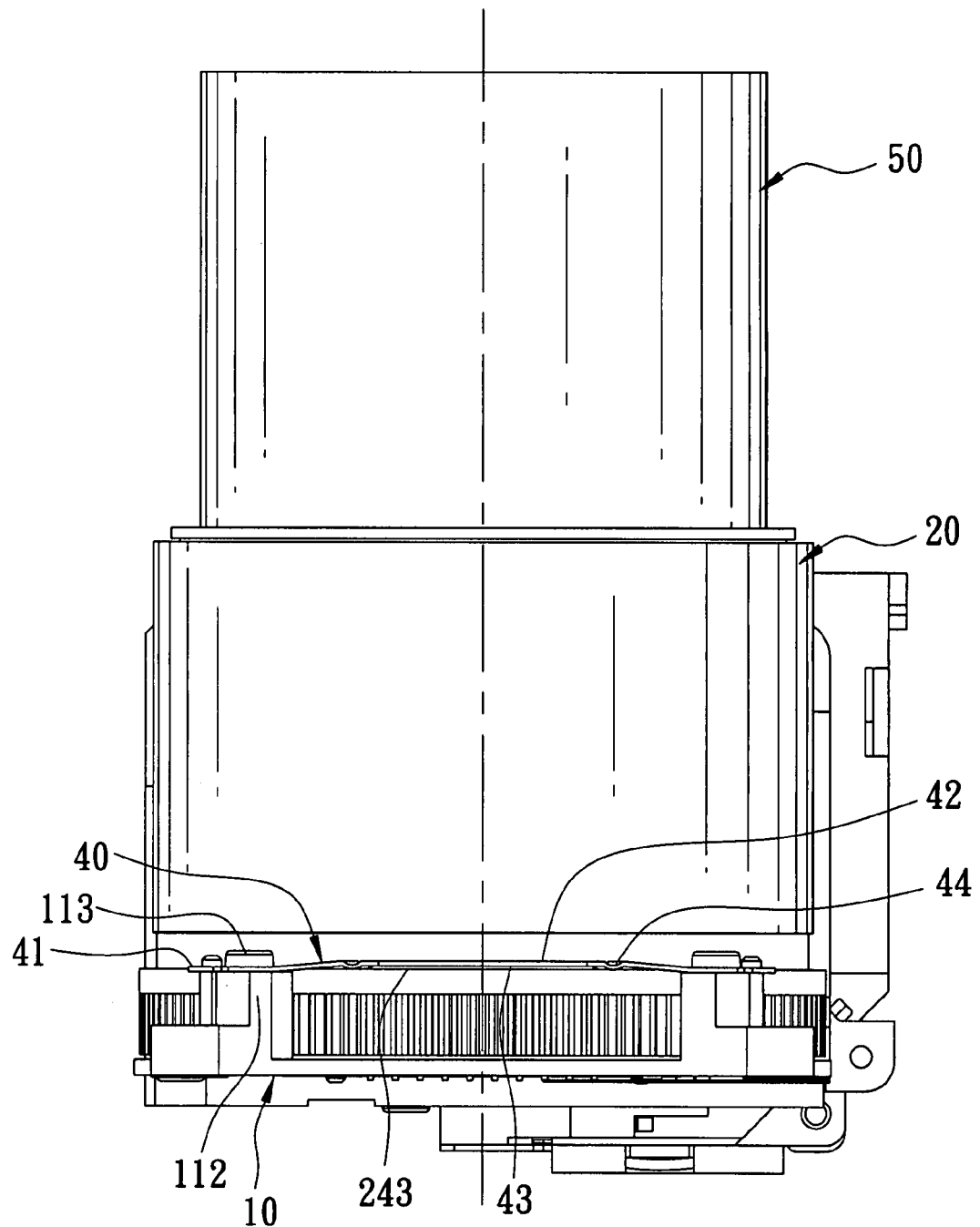
FIG. 7 is another side view of the preferred embodiment, illustrating how a press plate is connected to a base plate.
Figure 8:
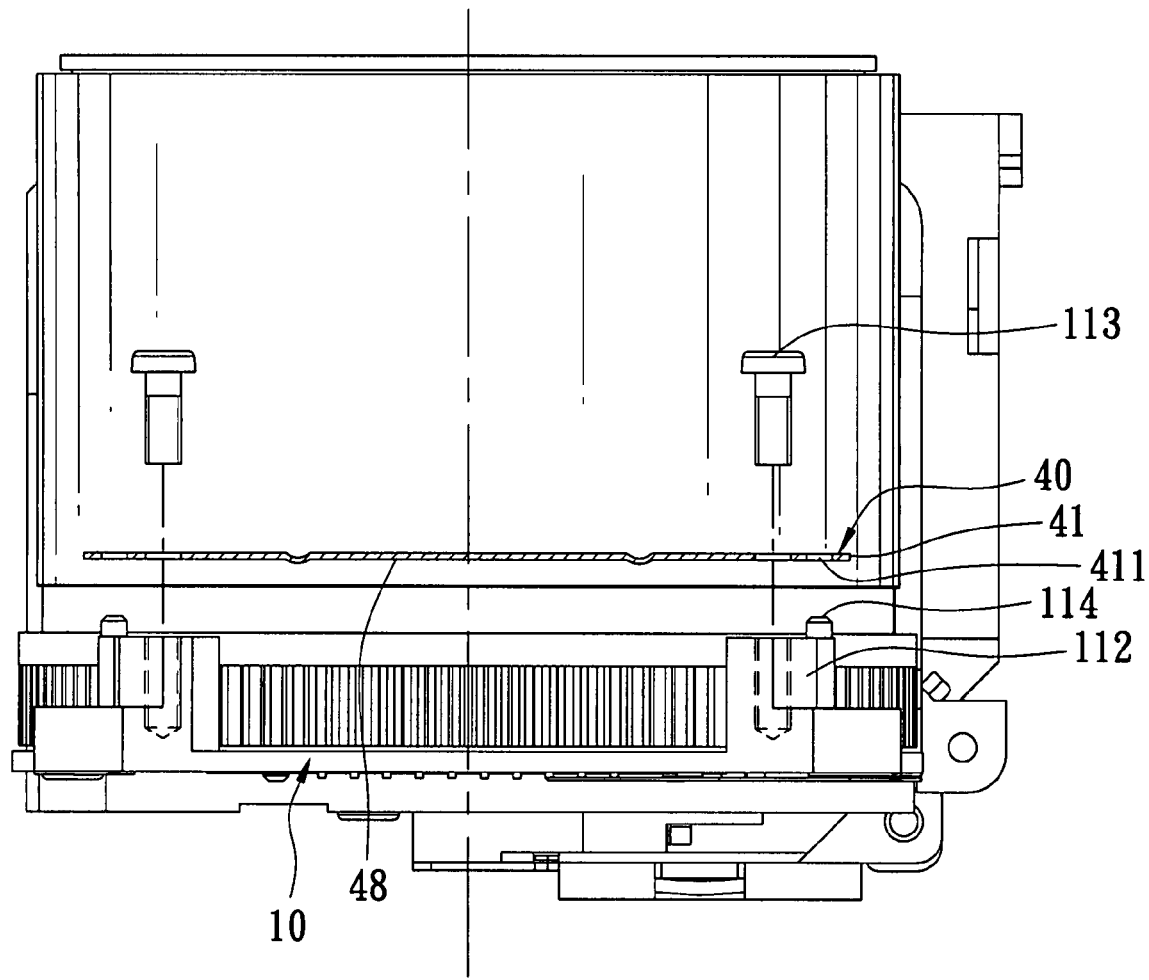
FIG. 8 is a partly exploded side view of the preferred embodiment.

The press plate 40 is a leaf spring, and has a pair of fixing end portions 41 mounted respectively to the positioning blocks 112 of the base plate 11 of the base unit 10, and a press section 42 interconnecting the fixing end portions 41. With further reference to FIGS. 7 and 8, the press section 42 has a press surface 43 facing the shoulder portion 243 of the annular outer surface 24 of the rotatable barrel component 20, a plurality of curved press protrusions 44 protruding from the press surface 43, and a pair of pin holes 411 (see FIG. 8) formed respectively in the fixing end portions 41 and through which the positioning pins 114 of the base unit 10 respectively extend. When the screws 113 of the base unit 10 are fastened respectively to the positioning blocks 112, the screws 113 press the fixing end portions 41, and the press section 42 elastically deforms relative to the fixing end portions 41 due to abutment of the press protrusions 44 against the shoulder portion 243 (see FIG. 7).

The first lens unit 50 extends into the inner space 121 in the stationary barrel component 12 of the base unit 10, and is movable relative to the base unit 10 along the axis (L). The first lens unit 50 includes a first lens barrel 51 and a first lens 52 that is disposed in the first lens barrel 51. The first lens barrel 51 has a plurality of first guide pins 511 (see FIG. 5) that extend through the first elongated slots 124 in the stationary barrel component 12 of the base unit 10, and that are guided by the first cam slots 231 in the rotatable barrel component 20.

In this embodiment, the second lens unit 60 is disposed in the inner space 121 in the stationary barrel component 12 of the base unit 10, and is movable relative to the base unit 10 along the axis (L). The second lens unit 60 includes a second lens barrel 61 and a second lens 62 that is disposed in the second lens barrel 61 and that is optically aligned with the first lens 52 of the first lens unit 50. The second lens barrel 61 has a plurality of second guide pins 611 (see FIG. 4) that extend through the second elongated slots 125 in the stationary barrel component 12 of the base unit 10, and that are guided by the second cam slots 232 in the rotatable barrel component 20.

In this embodiment, the third lens unit 70 is disposed in the inner space 121 in the stationary barrel component 12 of the base unit 10, and includes a supporting seat 71 that is secured on the base plate 11 of the base unit 10, and a third lens 72 that is disposed in the supporting seat 71 and that is optically aligned with the first lens 52 of the first lens unit 50 and the second lens 62 of the second lens unit 60. The second lens 62 is disposed between the first and third lenses 52, 72 along the axis (L).

In this embodiment, the spring 80 is a compression spring with two opposite ends abutting against the first lens barrel 51 of the first lens unit 50 and the second lens barrel 61 of the second lens unit 60, respectively. The spring 80 forces the first guide pins 511 of the first lens unit 50 and the second guide pins 611 of the second lens unit 60 to abut respectively against the first and second cam slots 231, 232 in the rotatable barrel component 20, thereby preventing the optical axes of the first and second lens units 50, 60 from tilting.

Figure 2:
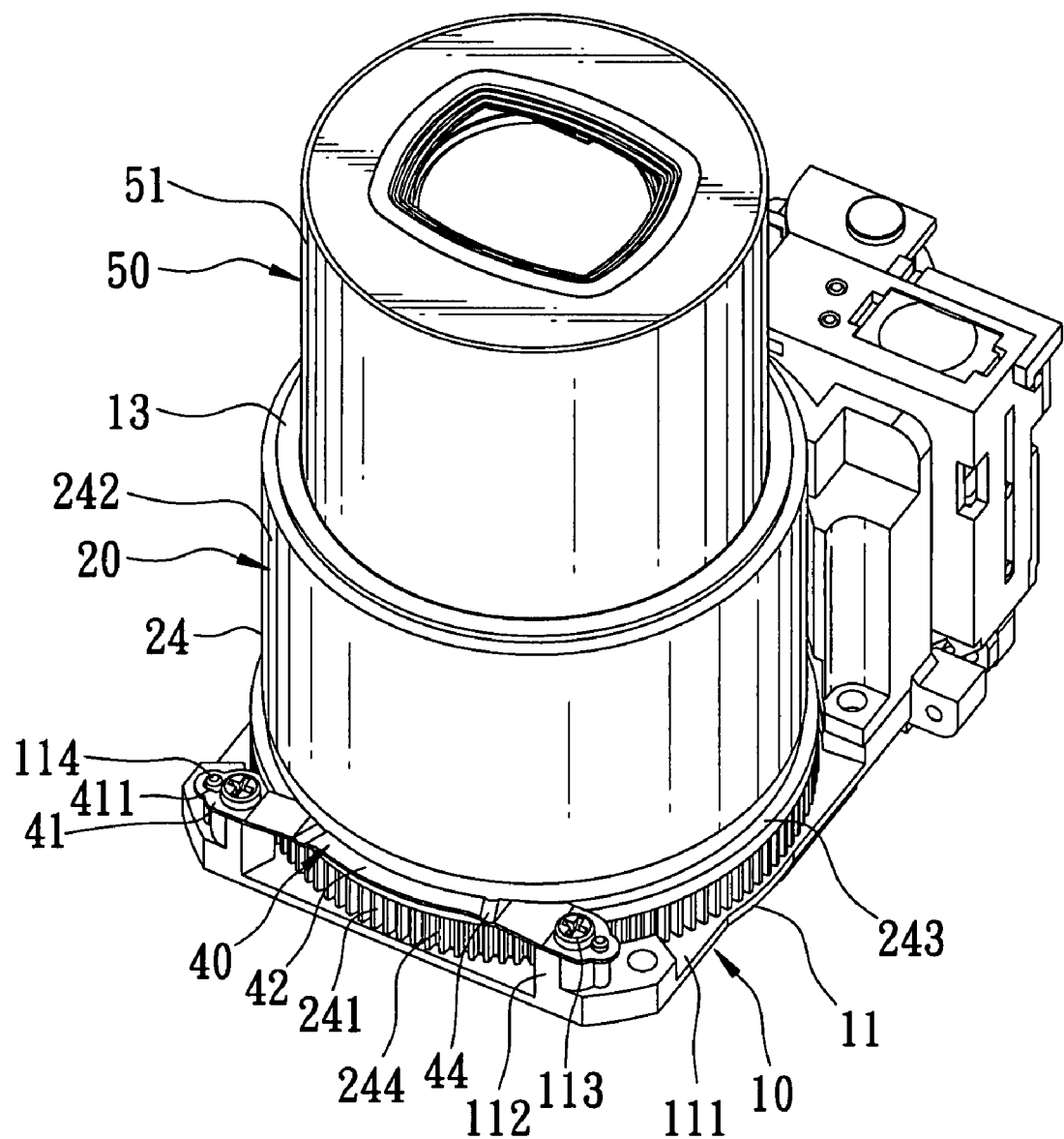
FIG. 2 is an assembled perspective view of a preferred embodiment of a lens device according to the invention.
Figure 4:
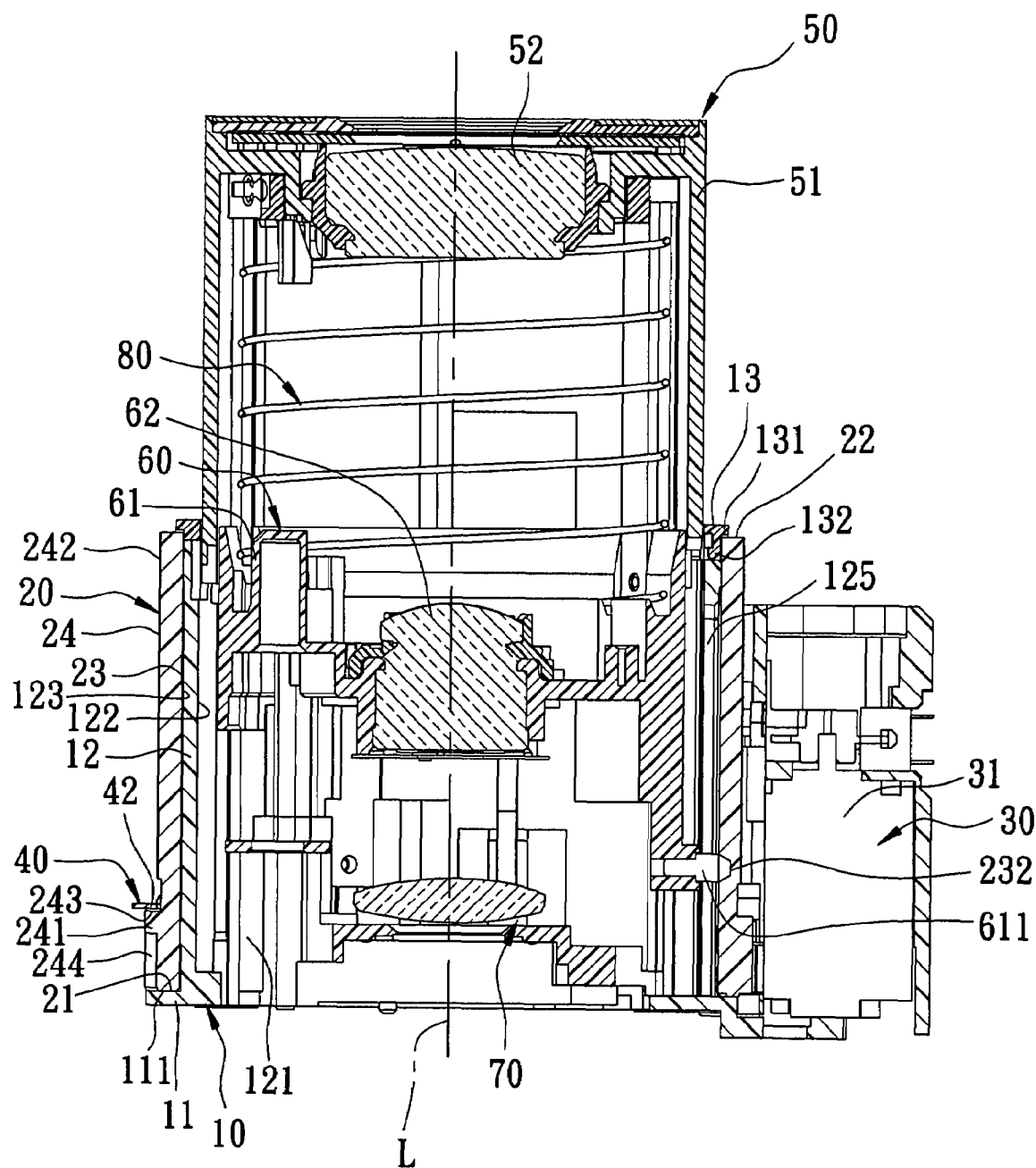
FIG. 4 is an assembled sectional view of the preferred embodiment taken along line 4-4 in FIG. 3.
Figure 5:
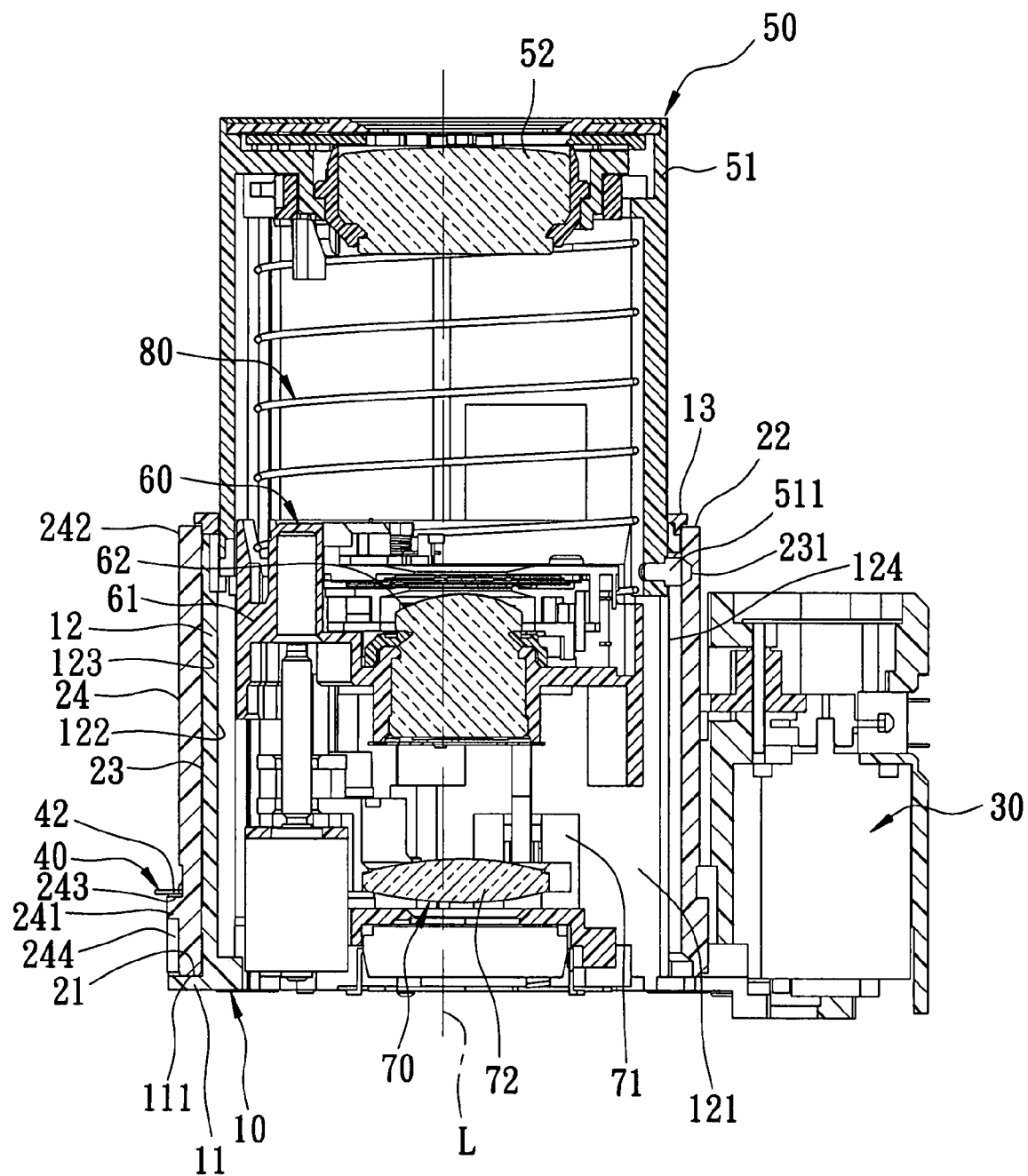
FIG. 5 is an assembled sectional view of the preferred embodiment taken along line 5-5 in FIG. 3.

As shown in FIGS. 2, 4, and 5, the rotatable barrel component 20 is disposed such that the first end face 21 thereof abuts against the positioning surface 111 of the base plate 11 of the base unit 10, and the press plate 40 elastically deforms relative to the fixing end portions 41 of the press plate 40 due to abutment of the press protrusions 44 of the press plate 40 against the shoulder portion 243 of the annular outer surface 24 of the rotatable barrel component 20. Therefore, the large diameter portion 241 of the annular outer surface 24 of the rotatable barrel component 20 is positioned between the positioning surface 111 and the press plate 40 and is unable to move along the axis (L). Moreover, the first and second lens units 40, 50 driven by the rotatable barrel component 20 can move precisely during zoom adjustment, and the drawback of image shaking can be eliminated effectively. Furthermore, since the press plate 40 is disposed to abut elastically against the shoulder portion 243 of the annular outer surface 24 of the rotatable barrel component 20, possible slipping between the rotatable barrel component 20 and the stationary barrel component 12 can be eliminated effectively.

Compared to the aforementioned conventional lens device, the disposition of the press plate 40 is simpler, thereby resulting in a lower manufacturing cost. In addition, it is easy to adjust the friction between the press section 42 of the press plate 40 and the shoulder portion 243 of the annular outer surface 24 of the rotatable barrel component 20 by loosening or tightening the screws 113 of the base unit 10.

It should be noted that, while this invention is exemplified using first, second, and third lens units 50, 60, 70, only one lens unit 50 may be employed in other embodiments of this invention, such as in lower end lens devices. Moreover, while in this preferred embodiment, the rotatable barrel component 20 is driven to rotate through a gear configuration, the rotatable barrel component 20 can be driven to rotate through a cam structure, or even by manual adjustment in other embodiments of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lens device comprising:

a base unit including a base plate that has a positioning surface, and a stationary barrel component that is connected to said base plate, that extends from said positioning surface of said base plate along an axis, and that has an inner barrel surface surrounding the axis and defining an inner space, and an outer barrel surface disposed opposite to said inner barrel surface in radial directions relative to the axis, said stationary barrel component being formed with a plurality of elongated slots that extend through said inner and outer barrel surfaces and that extend parallel to the axis;

a rotatable barrel component sleeved rotatably on said stationary barrel component, and having a first end face that abuts against said positioning surface of said base plate, a second end face that is disposed opposite to said first end face along the axis, an annular inner surface that interconnects said first and second end faces and that confronts said outer barrel surface of said stationary barrel component, and an annular outer surface that is disposed opposite to said annular inner surface in radial directions relative to the axis, said annular inner surface being formed with a plurality of cam slots that correspond respectively in position to said elongated slots in said stationary barrel component and that extend around the axis, said annular outer surface having a large diameter portion, a small diameter portion, and a shoulder portion that interconnects said large and small diameter portions;

a press plate having at least one fixing end portion secured to said base unit, and a press section connected to said fixing end portion, said press section being elastically deformable relative to said fixing end portion and being disposed to abut against said shoulder portion of said annular outer surface of said rotatable barrel component; and a first lens unit extending into said inner space in said stationary barrel component of said base unit and movable relative to said base unit along the axis, said first lens unit including a first lens barrel and a first lens that is disposed in said first lens barrel, said first lens barrel having a plurality of first guide pins that extend through said elongated slots in said stationary barrel component of said base unit, and that are guided by said cam slots in said rotatable barrel component.

2. The lens device as claimed in claim 1, wherein:

said base unit further includes a pair of positioning blocks protruding from said positioning surface of said base plate and disposed at two sides of said shoulder portion of said annular outer surface of said rotatable barrel component;

said press plate having a pair of said fixing end portions mounted respectively to said positioning blocks and interconnected by said press section.

3. The lens device as claimed in claim 2, wherein said press section has a press surface facing said shoulder portion of said annular outer surface of said rotatable barrel component, and a plurality of curved press protrusions protruding from said press surface to abut against said shoulder portion.

4. The lens device as claimed in claim 3, wherein said press plate is a leaf spring.

5. The lens device as claimed in claim 4, wherein:

said base unit further includes a pair of positioning pins, each of which protrudes from a respective one of said positioning blocks in a direction away from said positioning surface of said base plate; and said press plate further has a pair of pinholes formed respectively in said fixing end portions and through which said positioning pins respectively extend.

6. The lens device as claimed in claim 1, wherein said base unit further includes an annular ornamental component disposed opposite to said base plate and engaging fittingly said stationary barrel component.

7. The lens device as claimed in claim 1, further comprising a second lens unit disposed in said inner space in said stationary barrel component of said base unit and movable relative to said base unit along the axis, said second lens unit including a second lens barrel and a second lens that is disposed in said second lens barrel and that is optically aligned with said first lens, said second lens barrel having a plurality of second guide pins that extend through said elongated slots in said stationary barrel component of said base unit, and that are guided by said cam slots in said rotatable barrel component.

8. The lens device as claimed in claim 7, further comprising a third lens unit disposed in said inner space in said stationary barrel component of said base unit and including a third lens.

9. The lens device as claimed in claim 8, wherein said second lens is disposed between said first and third lenses along the axis.

10. The lens device as claimed in claim 1, wherein said large diameter portion of said annular outer surface of said rotatable barrel component is formed with gear teeth; said lens device further comprising a driving unit that includes a motor and a transmission gear unit driven by said motor and meshing with said gear teeth of said rotatable barrel component.

* * * * *